(12) United States Patent
Plishner

(10) Patent No.: US 7,475,747 B2
(45) Date of Patent: Jan. 13, 2009

(54) ELECTRIC OR HYBRID VEHICLE WITH A SPARE ELECTRIC MOTOR POWER SOURCE

(75) Inventor: Paul J. Plishner, 42 Foster Crossing, Southhampton, NY (US) 11968

(73) Assignee: Paul J. Plishner, Southampton, NY (US)

( * ) Notice: Subject to any disclaimer, the term of this patent is extended or adjusted under 35 U.S.C. 154(b) by 524 days.

(21) Appl. No.: 11/145,166

(22) Filed: Jun. 3, 2005

(65) Prior Publication Data

US 2006/0076836 A1     Apr. 13, 2006

(51) Int. Cl.
*B60K 6/22* (2007.10)

(52) U.S. Cl. .................. 180/65.4; 180/65.2; 903/905; 903/925; 903/943

(58) Field of Classification Search ............... 180/65.1, 180/65.2, 65.3, 65.4; 903/943, 905, 906, 903/925
See application file for complete search history.

(56) References Cited

U.S. PATENT DOCUMENTS

| | | | |
|---|---|---|---|
| 2,354,438 A | 7/1944 | Craig | |
| 3,182,742 A | 5/1965 | Dow | |
| 3,477,537 A | 11/1969 | Plishner | |
| 3,497,027 A * | 2/1970 | Wild | 180/65.4 |
| 3,690,397 A * | 9/1972 | Parker et al. | 180/65.6 |
| 4,199,037 A * | 4/1980 | White | 180/65.4 |
| 5,251,721 A * | 10/1993 | Ortenheim | 180/298 |
| 5,624,137 A | 4/1997 | Lesesne | |
| 5,788,004 A * | 8/1998 | Friedmann et al. | 180/65.2 |
| 6,390,215 B1 | 5/2002 | Kodama et al. | |
| 6,480,767 B2 * | 11/2002 | Yamaguchi et al. | 701/22 |
| 6,622,804 B2 * | 9/2003 | Schmitz et al. | 180/65.2 |
| 6,691,806 B2 | 2/2004 | Wolfgang et al. | |
| 6,799,650 B2 * | 10/2004 | Komiyama et al. | 180/65.2 |
| 6,877,576 B2 * | 4/2005 | Wilton et al. | 180/65.2 |
| 6,880,654 B2 * | 4/2005 | Plishner | 180/65.6 |
| 2004/0168420 A1 | 9/2004 | Fillman et al. | |
| 2007/0069586 A1 * | 3/2007 | Queveau et al. | 307/66 |

FOREIGN PATENT DOCUMENTS

| | | |
|---|---|---|
| EP | 1 283 382 | 2/2003 |
| WO | WO 00/74964 | 12/2000 |

* cited by examiner

*Primary Examiner*—Christopher P Ellis
*Assistant Examiner*—John D Walters
(74) *Attorney, Agent, or Firm*—Ware, Fressola, Van Der Sluys & Adolphson, LLP

(57) ABSTRACT

A secondary electric power source (19) for a motor vehicle having one or more electric motors (12) for driving respective wheels (10*a*) of the motor vehicle and having a main electric power source (14) for providing power to electric motors (12) driving the wheels (10*a*), and a selector (17) for selecting power from either the main electric power source (14) or the secondary electric power source (19) or both.

19 Claims, 3 Drawing Sheets

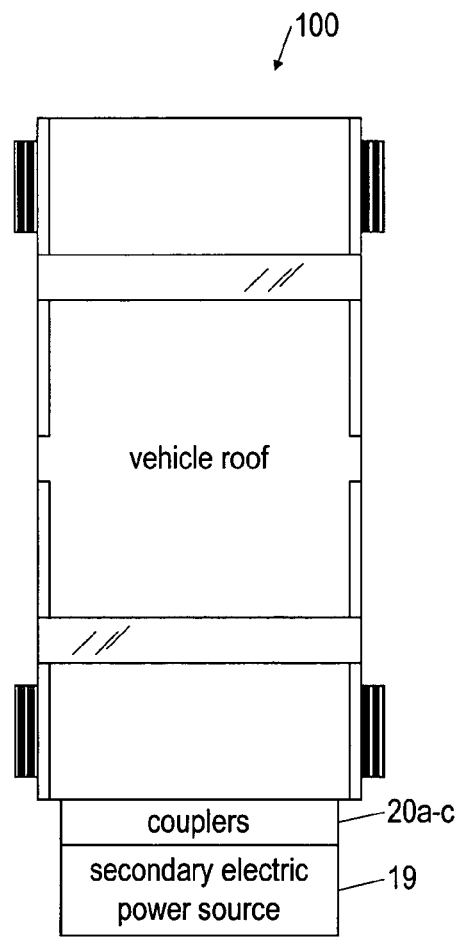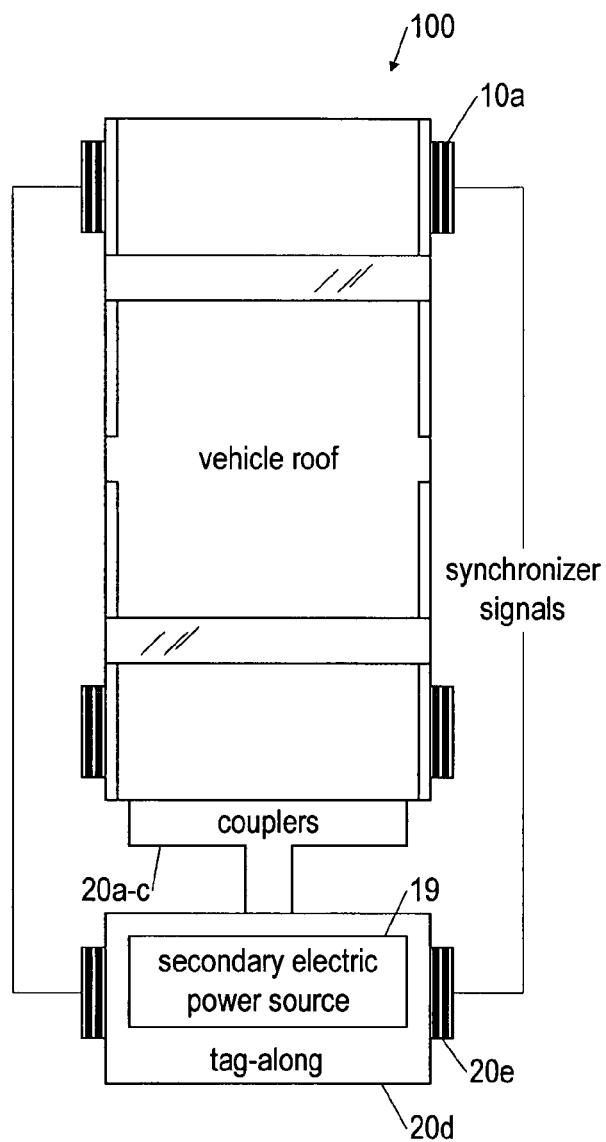
FIG. 3A
FIG. 3B

ELECTRIC OR HYBRID VEHICLE WITH A SPARE ELECTRIC MOTOR POWER SOURCE

FIELD OF THE INVENTION

The present invention pertains to the field of electric or hybrid motor-driven vehicles, including automobiles. More particularly, the present invention pertains to such vehicles having a spare electric power source.

BACKGROUND OF THE INVENTION

Electric cars and other electric-motor driven vehicles are known in the art, including so-called hybrid vehicles which use one or another combination of electric motor and fossil-fuel powered motor, which is in some cases a gas turbine, such as disclosed in U.S. Pat. No. 3,477,537, for an ELECTRIC MOTOR-DRIVEN AUTOMOBILE, issued Nov. 11, 1969, to the inventor of the present invention. The gas turbine of the '537 patent drives an electric generator, which in turn drives one or more electric motors, or charges an electric power source device—a fuel cell or battery—or does both, sometimes doing one under some driving conditions and doing the other under other driving conditions.

Besides hybrid vehicles using turbine engines as one power source, major automobile manufacturers, including Honda and Toyota, are now developing gasoline-electric hybrid vehicles. In these cars, a transmission is turned by, under some conditions, both a gasoline engine and an electric motor, and the transmission then turns the wheels of the vehicle in the same way as is done conventionally. (Thus, for such hybrid vehicles, there is only one electric motor providing a driving force/torque for all of the drive wheels, of which there are always at least two.)

In case of a pure electric vehicle, instead of a motor driving a generator, a fuel cell is often used as a source of electric power.

In case of an electric vehicle or a so-called series hybrid vehicle, as in the '537 patent, the drive force is provided (through more or less of a transmission system) by one or more electric motors, as opposed to other arrangements including a so-called parallel hybrid arrangement in which both a fossil-fueled motor and an electric motor cooperate to provide a drive force via a transmission.

Now in case of at least a series hybrid vehicle—even one having more than one electric motor—it would be advantageous to be able to quickly recover from failure of the electric power source, which would allow continued normal operation of the vehicle. The need for this is especially acute in military operations in battlefield conditions, where a power source failure can mean the crew is likely to be surrounded and possibly killed by enemy troops before help can arrive. Also, in case of an electric vehicle, a fuel cell can sometimes take so long to recharge that it is advantageous to have another source of electric power on the ready, which would again allow normal operation of the vehicle.

Thus, what is needed is a way to continue to provide electric power for an electric or hybrid vehicle when there is a failure of the main electric power source, i.e. in case of an electric vehicle, a state of discharge of the fuel cell, and in case of a hybrid including a motor-generator combination providing electric power to an electric motor, a failure of the electric generator that would ordinarily provide electric power for the electric motor, or a failure of the motor driving the electric generator.

SUMMARY OF THE INVENTION

Accordingly, in a first aspect of the invention, an apparatus is provided, comprising: a secondary electric power source (SEPS) for generating secondary electric power for a vehicle having an electric power source for providing main electric power to an electric motor used to provide drive power for at least one wheel of the vehicle; and means for selecting the secondary electric power either in replacement of or in addition to the main electric power, for use in powering the electric motor.

In accord with the first aspect of the invention, the SEPS may be a motor-generator set including an electric generator and a motor for turning the electric generator. The electric generator may include a winding for providing auxiliary power, and further, the winding may provide auxiliary power at 115 volts and 60 Hz. Also, in case of a motor-generator set as the SEPS, the SEPS may then also include a fuel coupler including a fuel pump for coupling to a fuel tank included in the vehicle, for drawing fuel from the fuel tank for powering the motor used to turn the electric generator. Alternatively, the SEPS may include its own fuel tank.

Also in accord with the first aspect of the invention, the SEPS may be a fuel cell.

Also in accord with the first aspect of the invention, the SEPS may be carried by a tag-along vehicle coupled to the vehicle. Alternatively, the SEPS may be attached to a side of the vehicle.

In a second aspect of the invention, a system is provided, comprising: an apparatus according to the first aspect of the invention and so including a SEPS; the motor vehicle including the main electric power source; and means for at least mechanically and electrically coupling the SEPS to the motor vehicle.

In a third aspect of the invention, a method is provided, comprising: a step of providing secondary electric power for a vehicle having an electric motor for providing main electric power for the vehicle; and a step of selecting the secondary electric power either in replacement of or in addition to the main electric power for use in powering the electric motor.

BRIEF DESCRIPTION OF THE DRAWINGS

The above and other objects, features and advantages of the invention will become apparent from a consideration of the subsequent detailed description presented in connection with accompanying drawings, in which:

FIG. 3A is a schematic/block diagram of a vehicle including a secondary electric power source close-coupled to the rear of the vehicle.

FIG. 3B is a schematic/block diagram of a vehicle including a secondary electric power source carried by (and coupled to) a tag-along (trailer) that is in turn coupled to the rear of the vehicle.

BEST MODE FOR CARRYING OUT THE INVENTION

Figure 1:
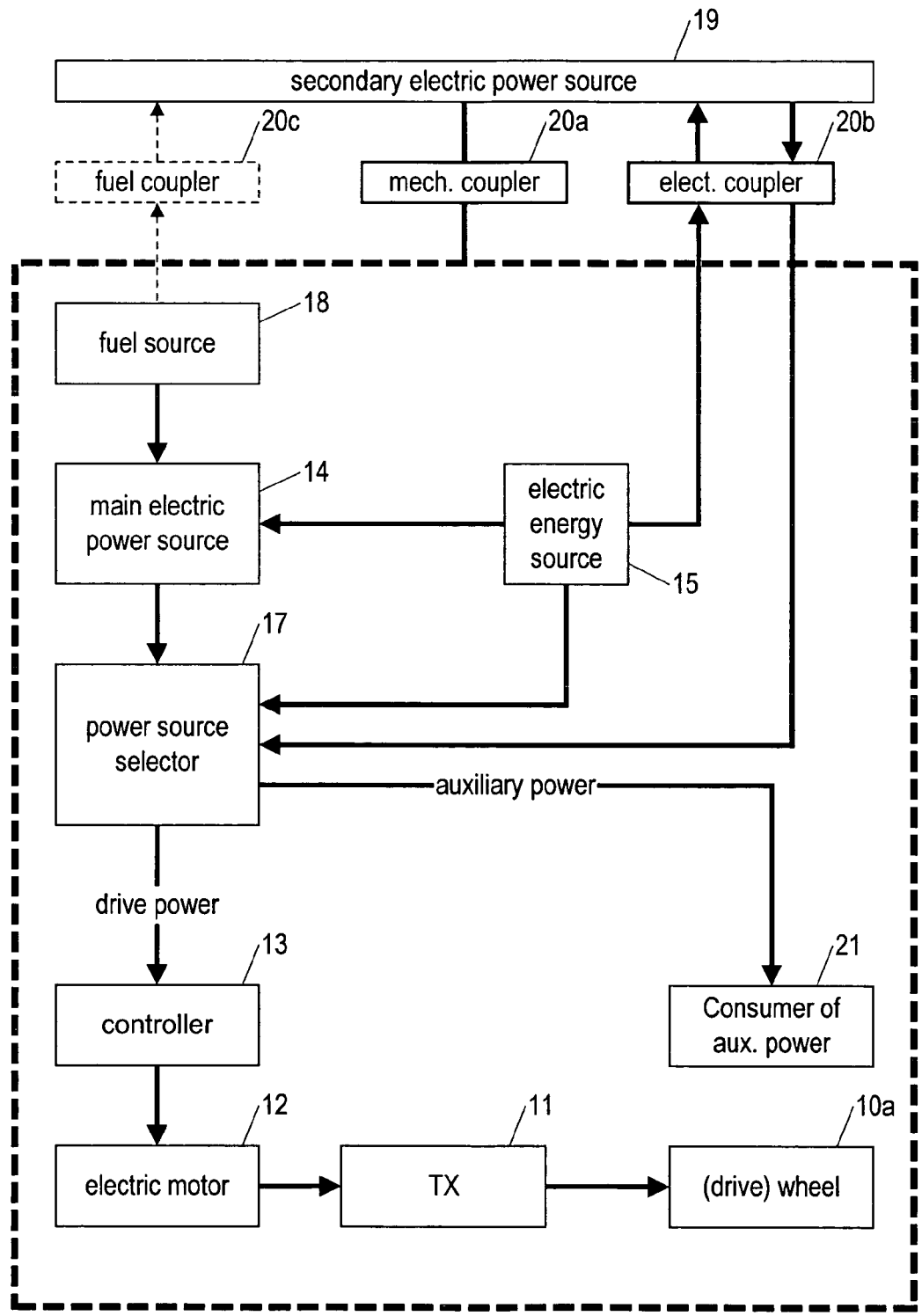
FIG. 1 is a schematic/block diagram of a series hybrid vehicle having a main electric power source and also a secondary electric power source coupled to the vehicle according to an embodiment of the invention.
Figure 2:
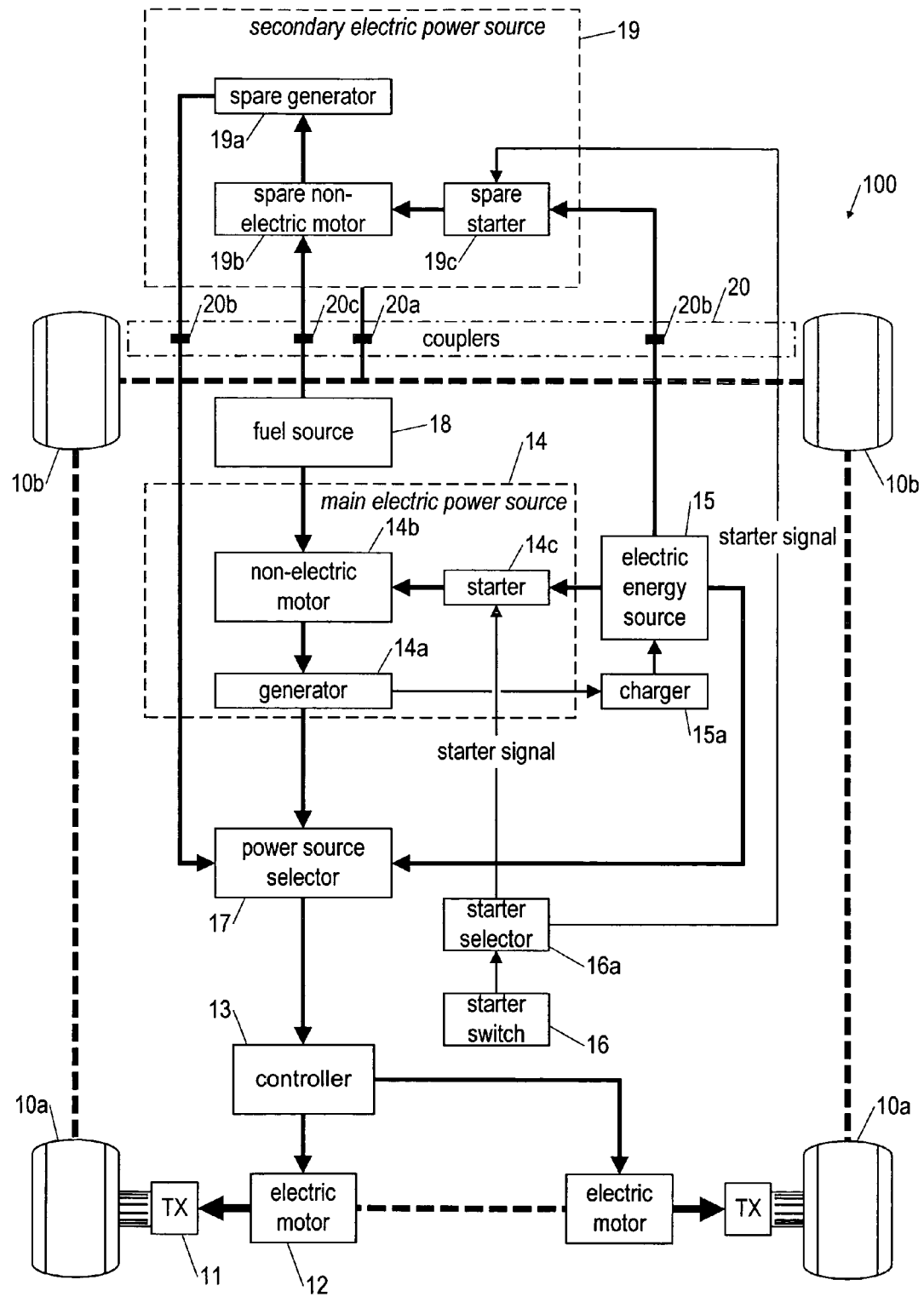
FIG. 2 is a more detailed schematic/block diagram of a series hybrid vehicle having a secondary electric power source in an embodiment of the invention in which the secondary electric power source is provided as a motor-generator set (and the series hybrid has two electric motors for respective driven wheels).

Referring now to FIGS. 1, 2, 3A and 3B, the invention provides a secondary electric power source (SEPS) 19 to provide backup or additional electric power for the electric motor or electric motors 12 of an electric or hybrid vehicle 100 via couplers 20, including at least a mechanical coupler 20a and an electrical coupler 20b. The SEPS 19 can be a motor-generator set including a spare generator 19a and a spare non-electric motor (fossil-fuel motor/internal combustion engine) 19b for driving the spare generator, and a spare starter 19c for starting the spare non-electric motor (using e.g. an electric energy source such as a battery included in the vehicle for electric power to turn the non-electric motor during starting operation). The SEPS 19 can also be simply a spare fuel cell, or any other means of generating electric power. In some embodiments, the SEPS can include a controller for conditioning or adapting the electric power for use by the electric motor(s) 12 of the vehicle 100, and for possibly regulating the power output based on control signals initiated by the driver of the vehicle. In other embodiments and as shown in FIGS. 1 and 2, the SEPS provides electric power to a controller 13 included in the vehicle (as opposed to being included in the SEPS), and the controller 13 conditions or otherwise adapts the power as needed, and under the control of driver provides the electric power to the electric motors 12.

Referring now in particular to FIGS. 3A and 3B, the SEPS 19 can be mechanically coupled to the vehicle so as to attach to the rear side of the vehicle 100 in a close-coupling arrangement, or it can be carried by (and attached to) a tag-along (trailer) 20d that is in turn coupled to the rear of the vehicle. In the usual case where the vehicle 100 has only front wheels 10a that turn, the wheels 20e of the tag-along can be synchronized to the front wheels 10a when backing up, so as to turn in the opposite direction from the front wheels. This avoids the need to maneuver in the usual reverse way when backing up a trailer, i.e. turning the wheels the opposite way from the direction the wheels would be turned without a trailer.

Referring now especially to FIGS. 1 and 2, the SEPS 19 is shown coupled to a series hybrid vehicle 100 including a main electric power source 14 (e.g. a main motor-generator set) having a generator 14a and a non-electric motor 14b (e.g. an internal combustion engine), with the non-electric motor using a fuel source 18 (e.g. a gas tank) as a source of energy for driving the electric generator 14a. The electric generator then provides electric power to the controller 13 via a power source selector 17, and the controller 13 in turn provides electric power (the amount being under the control of the driver) to two electric motors 12, each electric motor providing mechanical power to a respective drive wheel 10a via a respective transmission (TX) or gear arrangement 11. The SEPS is attached via the couplers 20 to the rear side of the vehicle near the rear wheels 10b, and uses the fuel source 18 (e.g. fuel tank) of the vehicle as an energy source for the spare non-electric motor 19b, provided via a fuel coupler 20c including a fuel pump or other equipment as needed to draw fuel from the fuel source. The invention of course also encompasses a SEPS including its own fuel source. (And as mentioned, the SEPS may even be a source of electric power that does not require a motor driving a generator in order to provide electric power.)

The power source selector 17 can be manually configured to select power from one or another or both the main and secondary electric power sources 14 19. In addition, or in the alternative, the power source selector can be provided so as to automatically switch from the main electric power source 14 to the secondary electric power source 19 using a relay to sense any interruption/failure of the main electric power source. The power source selector can even be provided so as to switch to the SEPS 19 not only in case of sensing actual interruption in power from the main electric power source 14, but also in case of sensing even only degraded performance (usually foretelling an actual interruption), thereby insuring a smooth, uninterrupted flow of electric power to the electric motors driving the vehicle. For example, in case of applications where the main electric power source is a motor-generator set (as in FIG. 2), the power source selector can be provided so as to switch to the SEP 19 in case of sensing a slowing down of the motor (driving the generator), or any kind of rough-running condition.

Advantageously, of course, the power source selector 17 switches to the SEPS 19 without having to stop the vehicle, and without having to get out of the vehicle. However, in some applications it may be more reasonable (e.g. from a cost and complexity standpoint) to provide a simple manual-operated power source selector, akin in its use and complexity to the manually operated fuel-tank selector used in smaller aircraft (to switch from one fuel tank to another). Of course an aircraft fuel-tank selector is operated from within the cockpit of the aircraft, whereas the power source selector 17 for a vehicle can be positioned (in cases where it is advantageous to do so) outside the vehicle cabin, so that an operator must exit the cabin to switch to the SEPS.

Referring now especially to FIG. 2, a vehicle according to the invention is shown as including a starter 14c for starting the main non-electric motor 14b, drawing electric power from an electric energy source 15 (e.g. a battery) to do so. The main generator is shown charging the electric energy source 15 via a charger 15a. The SEPS 19 is shown as including a spare starter 19c also drawing electric energy from the electric energy source 15. A starter selector 16a can select either the (main) starter 14c, the spare starter 19c, or both, so that the starter switch, when turned to on, can initiate flow of electric power to the power source selector from either the main electric power source 14 or the SEPS 19, or both. Thus, not only can the SEPS be of use in case of a breakdown in normal or routine operations, when it would be turned on after the breakdown but not before, but it can also be used in combination with the main electric power source 14 in non-routine operation.

For example, before going into battle, both the main motor-generator set and the SEPS could be started up, and battle would then be entered with both running. This would allow extra electric power to the electric motors (typically for only short bursts), and would also make the vehicle more survivable in that both the main motor-generator set and the SEPS would have to be disabled to stop the vehicle.

For vehicles likely to be used in or near battle, the SEPS is advantageously provided in a (ventilated) container armored against blast, fragment, and lower-caliber rounds. Ideally, the armoring material would be lightweight, such as e.g. high-modulus, high-strength polyethylene (PE) fibers having high strength-to-weight performance, available as SPECTRA fiber material (from Honeywell International, Colonial Heights, Va.) and DYNEEMA fiber material (from DSM, Heerlen, The Netherlands).

The SEPS 19 advantageously provides not only electric power for the one or more electric motors 12 of the vehicle, but also auxiliary power, i.e. power for cabin equipment (including navigation and communication equipment) and climate control. Referring again to FIGS. 1 and 2 showing a SEPS 19 using a spare electric generator 19a as part of a motor-generator set (also including the spare non-electric motor 19b), the auxiliary power can be provided by e.g. a winding (not shown) on the spare electric generator, a winding with the number of turns required to produce electric power at a desired voltage and frequency, e.g. 115 volts and 60 Hz. The power source selector 17 can draw a portion of the output of the SEPS (see FIG. 1) and provide it to equipment 21 consuming auxiliary electric power, possibly after conditioning by power conditioning equipment (not shown).

In case of a SEPS not including a motor-generator set but instead including some other means for providing electric power (e.g. a fuel cell) or a SEPS that provides DC power when AC power is required for auxiliary power, the SEPS 19 still advantageously provides auxiliary electric power, in ways that would be apparent to one skilled in the art. (For example, in case of a SEPS that provides DC power, and in case auxiliary power is required at 115 volts and 60 Hz, i.e. AC power, the SEPS can include an inverter/conditioner to provide the AC power, or such power conditioning equipment can be included only in the vehicle.)

The mechanical couplers 20a (FIG. 1) advantageously provide shock-mounting of the SEPS 19, i.e. the SEPS equipment is isolated from shock and vibration using materials and structures known to absorb or shed the energy associated with shock and vibration. In particular, techniques used in the aircraft industry for shock-mounting electronics equipment can be used. The electrical couplers 20b are advantageously provided so as to allow electrically disconnecting the SEPS 19 with relative ease, but at the same time providing a robust connection, and in case of combat vehicle applications, a connection able to withstand even the severe shock and vibration experienced in battle. In a typical application, the electrical coupler includes a pair of multi-contact connectors—one male and one female—with one at the end of a cable assembly leading into the vehicle, and the other at the end of the cable assembly leading into the SEPS. The two multi-contact connectors attach to each other (typically by a screwing or push and twist action) at or near where the SEPS is mounted to the vehicle. The attachment is advantageously mechanically reinforced. Any of a number of multi-contact connectors provided by AMPHENOL (Nottingham, UK) are typically suitable.

Although a SEPS according to the invention is shown and described above for use with a series hybrid vehicle, it is clear that the general principles indicated above apply also to a pure electric vehicle. In such applications, even though the electric vehicle uses fuel cells (i.e. and not a motor-generator set), the SEPS may be any source of appropriately conditioned electric power, such as a motor-generator set with a controller for conditioning the power for use with whatever electric motors are used by the electric vehicle. Alternatively, the SEPS could be simply another fuel cell. And as pointed out above, the SEPS for a hybrid vehicle could be simply a fuel cell and possibly a controller to condition the electric power from the fuel cell for use by the electric motors of the series hybrid.

Further, it will be realized by one skilled in the art that the invention is of use with other kinds of hybrid vehicles, not simply series hybrid vehicles. In such other vehicles, although typically both a non-electric motor and an electric motor provide power to a transmission, a SEPS can at least provide the electric power to the electric motor (which often is otherwise provided by a fuel cell, and so the SEPS here would serve as a source of an electrical energy boost and a spare electrical energy source).

A SEPS according to the invention is advantageously made as essentially a copy of whatever electric power source is used as the main electric power source. Thus, if the vehicle uses a motor-generator set, the SEPS is the same motor generator set, coupled to the vehicle via the couplers 20. If the vehicle uses a fuel cell, the SEPS is a fuel cell, and so on.

In case of embodiments using a tag-along (as opposed to embodiments in which the SEP is attached to the rear or other wall/side of the vehicle), the tag-along can carry not only the SEP, but also other spare equipment and even tools for repairing the vehicle. For example, the tag-along can carry an extra electric (drive) motor or motor box (i.e. the electric motor and gearing for driving a wheel), or an extra geared wheel, or spares for the electric motor/motor box or other components of the vehicle including e.g. relays for the electric circuits of the vehicle.

Further, a tag-along is advantageously provided according to the invention so as to use a standard hitch, as opposed to any kind of special hitching arrangement. Thus cost is reduced and, in addition, any other trailer using the standard hitch can be hitched up to the vehicle in place of the tag-along, when it is desirable to do so.

It is to be understood that the above-described arrangements are only illustrative of the application of the principles of the present invention. Numerous modifications and alternative arrangements to those described above may be devised by those skilled in the art without departing from the scope of the present invention, and the appended claims are intended to cover such other modifications and arrangements.

What is claimed is:

1. An apparatus, comprising:
   a secondary electric power source for generating electric power for a vehicle having a main electric power source for also providing electric power; and
   means for selecting as a power source for providing the electric power for use in powering an electric motor used to drive at least one wheel of the vehicle, an element from the set consisting of the secondary electric power source, the main electric power source, and both;
   wherein the secondary electric power source is a motor-generator set including an electric generator and a motor for turning the electric generator; and
   wherein the apparatus is configured so that the motor-generator set provides electric power to the electric motor via a power selector able to select either the main electric power source or the secondary electric power source or both, and via a controller for conditioning the electric power for use by the electric motor and for regulating the amount of power provided to the electric motor in response to control inputs by an operator.

2. An apparatus as in claim 1, wherein the electric generator includes a winding for providing auxiliary power.

3. An apparatus as in claim 2, wherein the winding provides auxiliary power at 115 volts and 60 Hz.

4. An apparatus as in claim 1, further comprising a fuel coupler including a fuel pump for coupling to a fuel tank included in the vehicle, for drawing fuel from the fuel tank for powering the motor used to turn the electric generator.

5. An apparatus as in claim 1, wherein the secondary electric power source is carried by a tag-along vehicle coupled to the vehicle.

6. An apparatus as in claim 1, wherein the secondary electric power source is attached to a side of the vehicle.

7. A system, comprising:
   an apparatus as in claim 1;
   the motor vehicle; and
   means for at least mechanically and electrically coupling the secondary electric power source of the apparatus to the motor vehicle.

8. A method, comprising:
a step of providing electric power from a main electric power source for powering an electric motor used to drive at least one wheel of a vehicle;
a step of selecting as a power source for providing the electric power for use in powering the electric motor an element from the set consisting of a main electric power source, a secondary electric power source, and both;
wherein the secondary electric power source is a motor-generator set including an electric generator and a motor for turning the electric generator; and
wherein the motor-generator set provides electric power to the electric motor via a power selector able to select either the main electric power source or the secondary electric power source or both, and via a controller for conditioning the electric power for use by the electric motor and for regulating the amount of power provided to the electric motor in response to control inputs by an operator.

9. A method as in claim 8, wherein the electric generator includes a winding for providing auxiliary power.

10. A method as in claim 9, wherein the winding provides auxiliary power at 115 volts and 60 Hz.

11. A method as in claim 8, further comprising a step of coupling to a fuel tank included in the vehicle, for drawing fuel from the fuel tank for powering the motor used to turn the electric generator.

12. A method as in claim 8, wherein the secondary electric power source is carried by a tagalong vehicle coupled to the vehicle.

13. A method as in claim 8, wherein the secondary electric power source is attached to a side of the vehicle.

14. An apparatus as in claim 1, wherein the power source selector allows for manual selection of one or another or both the main and secondary electric power sources.

15. An apparatus as in claim 1, wherein the power source selector is configured to automatically select one or another or both the main and secondary electric power sources.

16. An apparatus as in claim 1, wherein the power source selector is configured to automatically select the secondary electric power source in case of degraded performance of the main electric power source.

17. A method as in claim 8, wherein the power source selector allows for manual selection of one or another or both the main and secondary electric power sources.

18. A method as in claim 8, wherein the power source selector is configured to automatically select one or another or both the main and secondary electric power sources.

19. A method as in claim 8, wherein the power source selector is configured to automatically select the secondary electric power source in case of degraded performance of the main electric power source.

* * * * *